(12) United States Patent
Ihle et al.

(10) Patent No.: US 9,958,336 B2
(45) Date of Patent: May 1, 2018

(54) TEMPERATURE PROBE AND METHOD FOR PRODUCING A TEMPERATURE PROBE

(71) Applicant: EPCOS AG, Munich (DE)

(72) Inventors: Jan Ihle, Grambach (AT); Gerald Kloiber, Feldkirchen (AT)

(73) Assignee: EPCOS AG, Munich (DE)

( * ) Notice: Subject to any disclaimer, the term of this patent is extended or adjusted under 35 U.S.C. 154(b) by 395 days.

(21) Appl. No.: 14/442,365

(22) PCT Filed: Sep. 27, 2013

(86) PCT No.: PCT/EP2013/070252
§ 371 (c)(1),
(2) Date: May 12, 2015

(87) PCT Pub. No.: WO2014/072125
PCT Pub. Date: May 15, 2014

(65) Prior Publication Data
US 2016/0265979 A1    Sep. 15, 2016

(30) Foreign Application Priority Data

Nov. 12, 2012 (DE) .................. 10 2012 110 845

(51) Int. Cl.
*G01K 1/08* (2006.01)
*G01K 7/22* (2006.01)
(Continued)

(52) U.S. Cl.
CPC .............. *G01K 1/08* (2013.01); *G01K 7/22* (2013.01); *G01K 7/223* (2013.01); *B28B 1/24* (2013.01); *C04B 35/10* (2013.01); *C04B 35/64* (2013.01)

(58) Field of Classification Search
CPC . G01K 1/08; G01K 7/22; G01K 7/223; B28B 1/24; C04B 35/10; C04B 35/64
See application file for complete search history.

(56) References Cited

U.S. PATENT DOCUMENTS 4,283,261 A * 8/1981 Maurer .............. G01N 27/4071
204/408
5,142,266 A * 8/1992 Friese .................... G01K 7/223
338/22 R
(Continued)

FOREIGN PATENT DOCUMENTS

CN    101487742 A    7/2009
CN    202329858 U    7/2012
(Continued)

OTHER PUBLICATIONS

Feteira, A., "Negative Temperature Coefficient Resistance (NTCR) Ceramic Thermistors: An Industrial Perspective," Journal American Ceramic Society, 92 (5), pp. 967-983, Jan. 15, 2009.

*Primary Examiner* — Lisa Caputo
*Assistant Examiner* — Philip Cotey
(74) *Attorney, Agent, or Firm* — Slater Matsil, LLP

(57) ABSTRACT

The invention relates to a temperature probe which comprises a functional ceramic probe element and a ceramic housing. The probe element is mounted in the ceramic housing so that at a face of the probe element has direct and form-fitting contact with the ceramic housing. The invention further relates to a method for producing a temperature probe.

21 Claims, 3 Drawing Sheets

(51) Int. Cl.
  *B28B 1/24* (2006.01)
  *C04B 35/10* (2006.01)
  *C04B 35/64* (2006.01)

(56) References Cited

U.S. PATENT DOCUMENTS

| | | | | |
|---|---|---|---|---|
| 5,630,969 | A * | 5/1997 | Shimada | G01N 27/4067 264/642 |
| 6,297,723 | B1 * | 10/2001 | Shoji | G01K 7/22 338/229 |
| 6,341,892 | B1 * | 1/2002 | Schmermund | G01K 1/08 338/22 R |
| 2002/0131477 | A1 * | 9/2002 | Kurano | G01K 7/22 374/185 |
| 2002/0172258 | A1 * | 11/2002 | Adachi | G01K 7/22 374/185 |
| 2003/0072352 | A1 * | 4/2003 | Muziol | H05B 3/746 374/208 |
| 2004/0040843 | A1 * | 3/2004 | Weyl | G01N 27/4078 204/424 |
| 2004/0095987 | A1 * | 5/2004 | Damaschke | G01K 7/183 374/185 |
| 2006/0139144 | A1 * | 6/2006 | LaBarge | G01K 7/16 338/308 |
| 2006/0222050 | A1 * | 10/2006 | Byrne | G01K 1/12 374/208 |
| 2008/0080592 | A1 * | 4/2008 | Houben | G01K 1/08 374/185 |
| 2009/0016409 | A1 * | 1/2009 | Mizoguchi | C01G 45/125 374/185 |
| 2009/0148657 | A1 * | 6/2009 | Ihle | B28B 1/24 428/131 |
| 2009/0169900 | A1 * | 7/2009 | Oberle | F23Q 7/001 428/450 |
| 2009/0323765 | A1 * | 12/2009 | Yokoi | G01K 1/08 374/185 |
| 2010/0034237 | A1 * | 2/2010 | Kamenov | G01K 7/183 374/185 |
| 2011/0013669 | A1 * | 1/2011 | Raj | G01K 1/08 374/179 |
| 2011/0051778 | A1 * | 3/2011 | Kloiber | G01K 7/223 374/185 |
| 2011/0309848 | A1 * | 12/2011 | Eberheim | B22F 3/225 324/724 |
| 2012/0063488 | A1 * | 3/2012 | Nakayama | G01K 1/10 374/185 |
| 2013/0223479 | A1 | 8/2013 | Satou et al. | |

FOREIGN PATENT DOCUMENTS

| | | | |
|---|---|---|---|
| CN | 202372275 U | 8/2012 | |
| DE | 10238628 A1 | 3/2004 | |
| DE | 102008002191 A1 | 12/2009 | |
| EP | 1785705 A1 | 5/2007 | |
| FR | 2880685 A1 | 7/2006 | |
| JP | S629137 U | 1/1987 | |
| JP | S62150643 U | 9/1987 | |
| JP | H0854291 A | 2/1996 | |
| JP | 2011247876 A | 12/2011 | |
| WO | WO 2011102810 A1 * | 8/2011 | ............ G01K 1/08 |

* cited by examiner

TEMPERATURE PROBE AND METHOD FOR PRODUCING A TEMPERATURE PROBE

This patent application is a national phase filing under section 371 of PCT/EP2013/070252, filed Sep. 27, 2013, which claims the priority of German patent application 10 2012 110 845.5, filed Nov. 12, 2012, each of which is incorporated herein by reference in its entirety.

TECHNICAL FIELD

The present invention relates to a temperature sensor system including a temperature probe and a method for producing the same.

BACKGROUND

The measuring of temperatures for monitoring and controlling purposes in the most varied applications is effected, for example, using ceramic hot conductor thermistor elements (—"negative temperature coefficient thermistor" or "NTC thermistor"), silicon temperature sensors (for example what are known as "KTY temperature sensors"), platinum temperature sensors (—"platinum resistance temperature detector" or "PRTD") or thermo elements (—"thermocouple" or "TC"). Ceramic sensor elements are usually provided with a coating produced from a polymer or a glass for sufficient mechanical stability, for protection against external influences and for avoiding corrosion as a result of aggressive media, and for avoiding temperature-related material changes as a result of the gas atmosphere in an NTC material or in an electrode. The maximum operating temperatures of such sensor elements are limited to approximately 200° C. in the event of a polymer covering and to approximately 500° C. in the event of a glass covering.

However, it is not readily possible to use the described sensor elements permanently for measuring very high temperatures and/or in particularly aggressive media. Nevertheless, in order to be able to plan for use in aggressive media, the sensor elements are often built into a housing of plastics material or high-grade steel. In addition, casting materials are very frequently used for producing a thermal contact with the element. A great disadvantage of the systems constructed in this manner is their delayed response time on account of the additional structural-related thermal transfers and the low thermal conduction of the materials used. A particular disadvantage of temperature probes with a polymer or glass covering is the geometry of the temperature probe which fluctuates greatly and cannot be closely toleranced. Consequently, said temperature probes are not suitable for standard installations.

SUMMARY

Embodiments of the present invention include temperature probes which comprise a high level of sturdiness as well as a short response time. Methods for producing temperature probes according to exemplary embodiments are described.

A temperature probe according to at least one embodiment comprises a functional ceramic sensor element and a ceramic housing. The functional ceramic sensor element is preferably realized as a ceramic thermistor element. For example, the functional ceramic sensor element can be an NTC thermistor element, i.e. a hot conductor. NTC thermistor elements are distinguished in particular on account of their low production costs. A further advantage of NTC thermistor elements, for example compared to thermo elements or metallic resistor elements such as, for example, Pt elements, consists in a marked negative resistance temperature characteristic. In addition, it is possible for the functional characteristic sensor element to be realized as a PTC thermistor element (positive temperature coefficient or "PTC"), i.e. as a cold conductor.

The sensor element is preferably arranged in such a manner in the ceramic housing that at least one side face of the sensor element comprises a direct and positive locking contact with the ceramic housing. For example, the functional ceramic sensor element can comprise several side faces, at least one side face being in direct contact with an inside wall of the ceramic housing over its entire area. In this case, the inside wall of the ceramic housing in this region is preferably adapted in form to the side face of the sensor element such that the positive locking contact is produced between the inside wall of the sensor element and the inside wall of the ceramic housing. No further elements such as, for example, sealing materials or heat-conducting pastes, are arranged between the side faces of the sensor element, which are in direct and positive locking contact with the ceramic housing, and the ceramic housing.

In an advantageous manner, on account of the ceramic housing and of the positive locking bond to the functional ceramic sensor element, the temperature probe comprises very short response times which, in dependence on the wall thickness and on the material of the ceramic housing, are less than three seconds. The response times can preferably be less than a second and, for example, when the ceramic housing comprises very thin wall thicknesses, can even be a few milliseconds.

According to a further embodiment, the ceramic housing comprises a structural ceramic material with a high level of thermal conductivity or consists of such a material. The ceramic housing preferably comprises aluminum oxide. A ceramic housing of this type is advantageously distinguished by a particularly high level of thermal conductivity. The ceramic housing can comprise different quality aluminum oxide. For example, the ceramic housing can comprise aluminum oxide with a purity of at least between 95% and 99.9% or more. In this case, the sturdiness of the ceramic housing with reference to mechanical strength and to chemical resistance and the thermal conductivity increase with the purity of the material. According to a particularly preferred embodiment, the ceramic housing consists of aluminum oxide. As an alternative to this, the ceramic housing can comprise a different ceramic material such as, for example, aluminum nitride or silicon carbide or can consist thereof.

According to a further embodiment, the ceramic housing is an injection molded housing. The ceramic housing can be produced, in particular, by means of ceramic injection molding technology, for example by means of the so-called ceramic micro injection molding technology. By means of the ceramic micro injection molding technology, very small housing forms of the ceramic housing, which are adapted to the dimensions of the sensor element, can be advantageously produced in a precise and reproducible manner comprising a very high mechanical strength, standardized installation geometry being made possible.

According to a further embodiment, the ceramic housing comprises an opening, by means of which the ceramic housing is open at one side. The ceramic housing preferably comprises a cavity which comprises a bottom surface which is opposite the opening and has a step-shaped indentation. The sensor element is preferably arranged at least partially recessed in the indentation. The indentation can provide, for example, a recessed region inside the cavity, the recessed region being connected to the rest of the cavity by means of a step. At least one side face of the sensor element is preferably situated in direct and positive locking contact with at least one part region of the bottom area of the indentation.

According to a further embodiment, the ceramic housing comprises a rounded end which is opposite the opening on the outside surface. For example, the end of the ceramic housing which is opposite the opening on the outside face can comprise a part-spherical or hemispherical region.

According to a further embodiment, the indentation comprises a main region and two side pockets which adjoin two opposite sides of the main region. The sensor element is preferably arranged at least in part in the main region. For example, the main region of the indentation with regard to its form and size can be adapted in such a manner to the form and size of the sensor element that the sensor element is able to be arranged completely in the main region of the indentation, the sensor element filling out the main region as completely as possible. In a preferred manner, the side pockets comprise a depth which, when viewed from the opening, is smaller than a depth to the bottom surface of the recessed region of the indentation which, as described above, is connected to the rest of the indentation by means of a step. In particular, when looking into the opening, the recessed region can be arranged between the side pockets.

According to a further embodiment, the temperature probe comprises two contact elements. Each of the contact elements is preferably arranged at least in part in one of the side pockets which adjoin the main region. In addition, the contact elements are preferably connected to the sensor element so as to be electrically conducting. The side pockets can be adapted, for example with regard to their form and size, to a diameter of the contact elements such that the contact elements are able to be inserted at least in part into the side pockets. In addition, the contact elements project out of the ceramic housing. The contact elements preferably comprise temperature-stable materials with a low corrosion tendency. For example, the contact elements can consist of noble metals such as, for example, platinum, gold, silver or highly temperature-stable steel alloys, preferably with a high chrome and/or nickel content or can consist of one of these materials.

According to a further embodiment, the contact elements are realized as connecting wires. For example, the contact elements can be realized in the form of copper wires which are sheathed with nickel or with one or several of the other metals mentioned previously.

According to a further embodiment, the sensor element comprises two electrodes. The electrodes are preferably mounted on two opposite side faces of the sensor element. The contact elements are preferably connected to one of the electrodes of the sensor element so as to be electrically conducting in each case by means of a burnt on metallization paste which is arranged in the side pockets. In this case, ends of the contact elements can be embedded in each case into the metallization pastes which are inserted into the side pockets. Independently of the maximum operating temperature of the temperature probe, the electrodes of the sensor element can comprise metals, for example platinum, gold, silver or metal alloys, for example silver-palladium or can consist thereof. The metallization pastes which serve for the electrical contact between the contact elements and the electrodes of the sensor elements preferably comprise noble metals such as, for example, gold, silver or platinum or consist thereof. In addition, the metallization pastes can comprise copper, molybdenum or tungsten or a metal alloy, for example silver-palladium, or can consist thereof.

According to a further embodiment, the opening of the ceramic housing is closed by means of a glass sealant. The contact elements preferably project out of the glass sealant and consequently extend from the interior of the opening through the glass sealant to the outside. The glass sealant comprises, for example, alkali-free and/or heavy metal oxide-free glass with a coefficient of expansion which is adapted to the material of the ceramic housing. In an advantageous manner, the material used for the glass sealant comprises a softening point which is at least 50° C. above a maximum operating temperature of the temperature probe.

According to a further embodiment, the sensor element comprises a perovskite structure including the elements Y, Ca, Cr, Al and O. In addition, the perovskite-based sensor element can comprise the element Sn.

According to a further embodiment, the sensor element comprises a ceramic material with a perovskite structure of the general chemical formula $ABO_3$. These types of sensor elements are preferred in particular for highly temperature stable probes which are to be suitable for high application temperatures. In a particularly preferred manner, the functional ceramic sensor element comprises the composition $(Y_{1-x}Ca_x)(Cr_{1-y}Al_y)O_3$ where x=0.03 to 0.05 and y=0.85.

According to a further embodiment, the sensor element comprises a spinel structure including the elements Ni, Co, Mn and O. The spinel-based sensor element can additionally comprise one or several of the following elements: Al, Fe, Cu, Zn, Ca, Zr, Ti and Mg.

According to a further embodiment, the sensor element comprises a ceramic material with a spinel structure of the general chemical formula $AB_2O_4$ or $B(A,B)O_4$. These types of sensor elements are preferred in particular at low application temperatures. According to a particularly preferred embodiment, the functional ceramic sensor element comprises the composition $Co_{3-(x+y)}Ni_xMn_yO_4$ where x=1.32 and y=1.32.

According to a further embodiment, the ceramic housing comprises wall thicknesses of between 0.1 mm and 1 mm. This can signify in particular that the ceramic housing which is open at one end comprises at least one housing wall which comprises thicknesses of between 0.1 mm and 1 mm. In a preferred manner, the ceramic housing comprises wall thicknesses everywhere within the named range. According to a particular preferred embodiment, the ceramic housing comprises wall thicknesses of between 0.3 mm and 0.7 mm. A particularly short response time of the temperature probe can be achieved as a result of the ceramic housing having these types of wall thicknesses.

In an advantageous manner, the temperature probe described here comprises very short response times, very high mechanical as well as chemical robustness and very good long-term stability. Further advantages lie in very precise realization of the ceramic housing dimension which makes simple and standardized assembly possible without additional system elements.

In addition, a method for producing a temperature probe is provided. The temperature probe which can be produced or is produced as a result can comprise one or several features of the aforementioned embodiments. The embodiments described previously and below apply equally to the temperature probe and to the method for producing the temperature probe.

According to one embodiment, a ceramic raw material as well as a functional ceramic sensor element which is provided with electrodes are prepared for producing the temperature probe. The functional ceramic sensor element can be, for example, an NTC or PTC thermistor element. The ceramic raw material can be, for example, a so-called ceramic feedstock which comprises a structural ceramic powder, such as, for example, an aluminum oxide powder, and an organic binding means. The raw material is injected into a corresponding mold by means of an injection molding process. The so-called "green bodies" which are created thereby are then preferably freed extensively from the organic part in a debinding process which is in two steps, i.e. aqueous and thermal, or one step, i.e. only thermal. The debound bodies are then sintered at a suitable temperature to form a ceramic housing. For example, the sintering is effected in the case of aluminum oxide, independently of the purity of the material, at temperatures of between 1600° C. and 1700° C. In addition, the prepared sensor element is arranged in such a manner in the ceramic housing, which has been produced in this manner, that at least one side face of the sensor element comprises a direct and positive locking contact with the ceramic housing.

According to a further embodiment, once the sensor element has been arranged in the ceramic housing, the contact elements are connected to the electrodes of the sensor element so as to be electrically conducting in each case by means of a metallization paste. For example, the metallization pastes can be dosed into the side pockets of the indentation and the contact elements can then be inserted into the side pockets such that the ends of the contact elements are embedded in each case in the metallization paste. The metallization paste is then preferably burnt on at a suitable temperature which is dependent on the material of the metallization paste used.

According to a further embodiment, the opening of the ceramic housing is closed by means of a glass paste. The glass paste is then burnt on at a suitable temperature. The glass material used for the glass paste is preferably matched to the future operating temperature of the temperature probe and comprises a softening point TG of at least 50° C. above the maximum operating temperature of the temperature probe.

According to a further embodiment, for setting a low resistance tolerance the resistance of the elements is readjusted within a limited range by means of a subsequent tempering process.

BRIEF DESCRIPTION OF THE DRAWINGS

Further advantages and advantageous embodiments of the temperature probe are produced from the embodiments described below in conjunction with FIGS. 1 to 6, in which.

DETAILED DESCRIPTION OF ILLUSTRATIVE EMBODIMENTS

Identical or identically acting components can in each case be provided with the identical references in the exemplary embodiments and figures. The elements shown and the size ratios thereof with respect to one another are fundamentally not to be seen as true to scale. Rather, individual elements such as, for example, layers, components and regions are shown excessively thick or in a larger dimension for better presentation and/or for better understanding.

Figure 1:
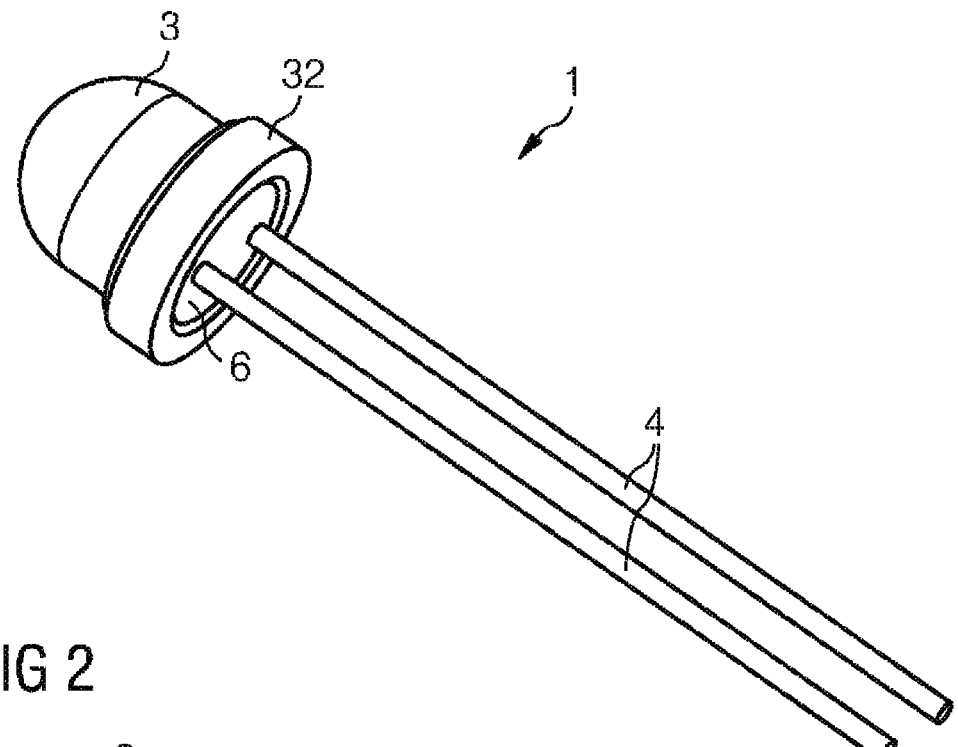
FIGS. 1 and 2 show schematic views of a temperature probe according to an exemplary embodiment.
Figure 2:
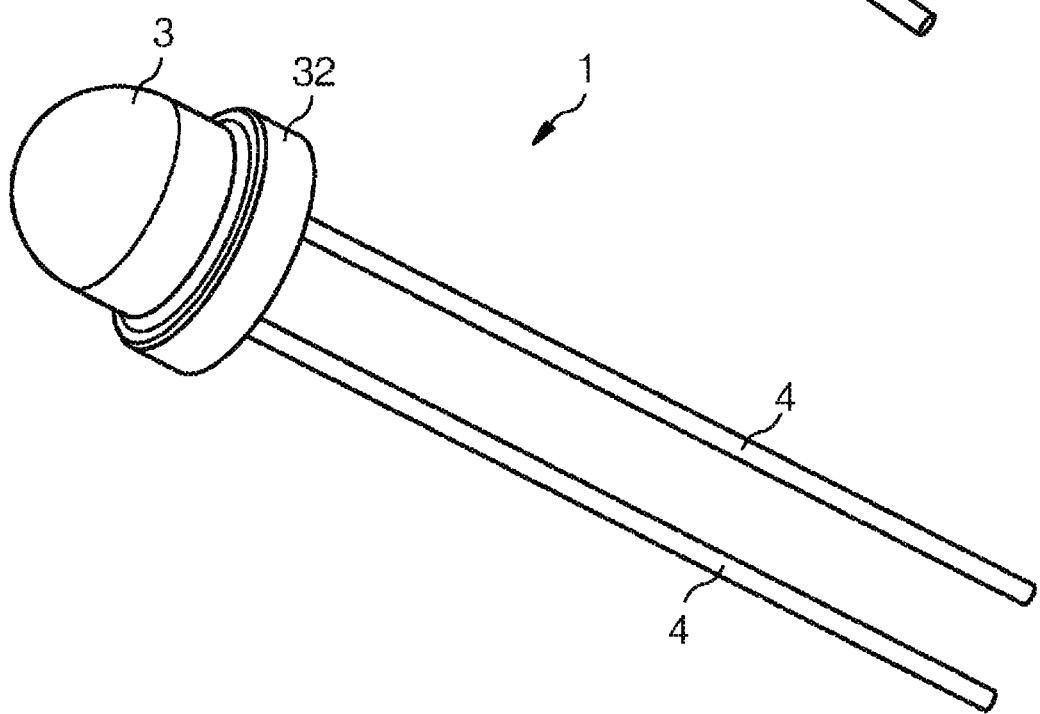
Figure 3:
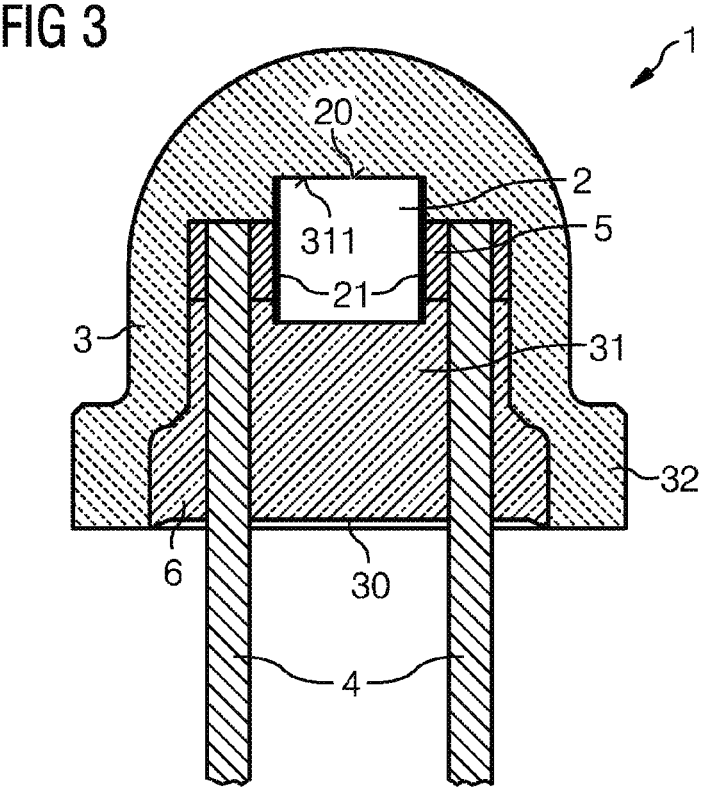
FIG. 3 shows a sectional representation of a temperature probe according to a further exemplary embodiment.
Figure 4:
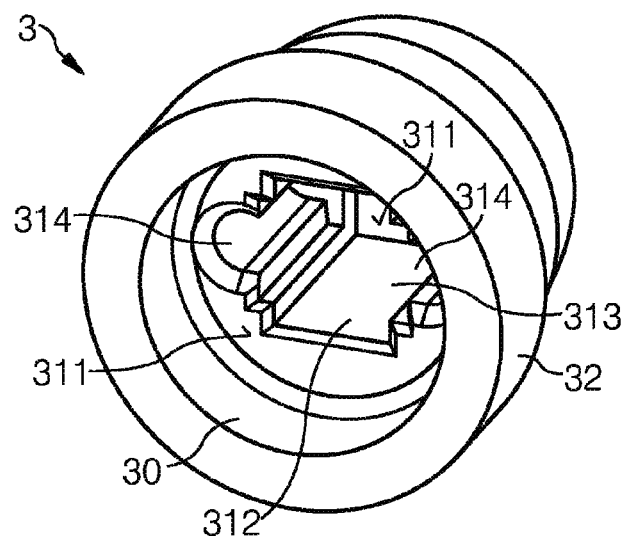
FIG. 4 shows a schematic view of a ceramic housing of a temperature probe according to a further exemplary embodiment.
Figure 5:
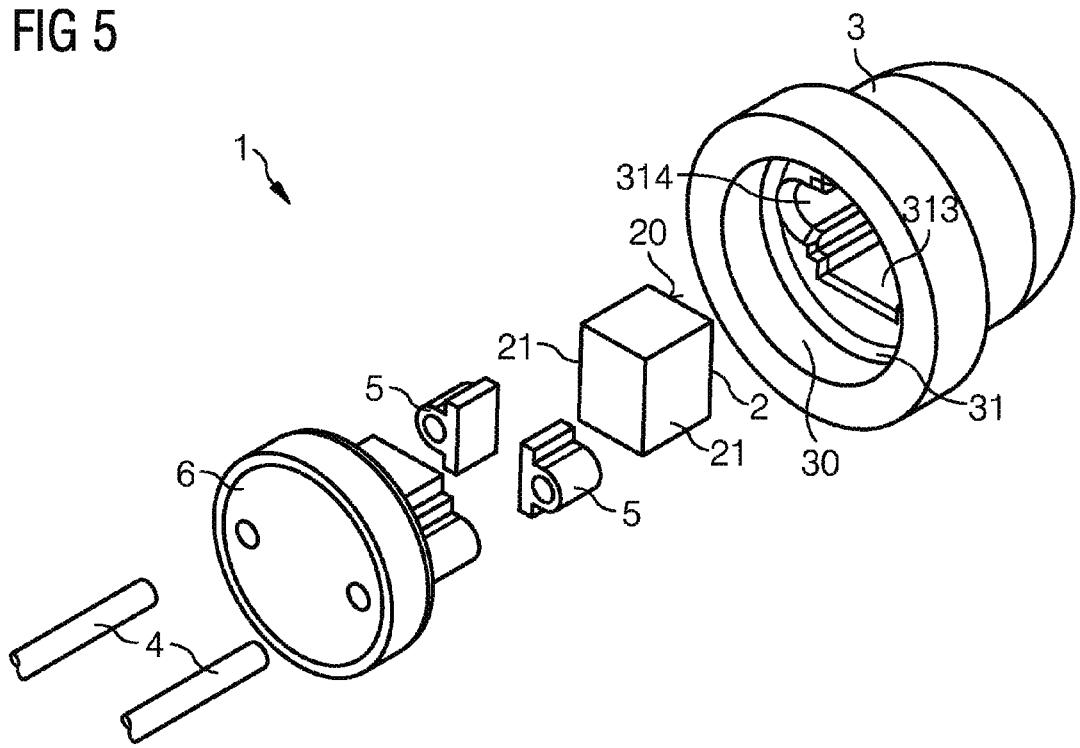
FIG. 5 shows a schematic representation of a temperature probe in the form of an exploded drawing according to a further exemplary embodiment.

FIGS. 1 and 2 show different schematic views of a temperature probe 1 described in this case according to one exemplary embodiment. The elements of the temperature probe 1 which are not shown in FIGS. 1 and 2 are shown in the sectional view of the temperature probe 1 in FIG. 3, in the schematic representation of the ceramic housing 3 in FIG. 4 as well as in the exploded drawing of the temperature probe 1 in FIG. 5. The following description relates equally to FIGS. 1 to 5.

The temperature probe 1 comprises a functional ceramic sensor element 2, which is realized as an NTC thermistor element, and a ceramic housing 3. The functional ceramic sensor element 2 is arranged in such a manner in the ceramic housing 3 that a side face 20 of the sensor element 2 comprises a direct and positive locking contact with the ceramic housing 3, in particular with a bottom surface 311 of the ceramic housing 3. The ceramic housing 3 comprises aluminum oxide with a purity in excessive of or equal to 95% and is realized as an injection molded housing which is produced by means of so-called ceramic micro injection molding technology. As an alternative to this, the ceramic housing 3 can comprise one or several other ceramic materials, preferably with good heat conductivity.

The functional ceramic sensor element comprises a ceramic with a perovskite structure. In particular, the ceramic of the sensor element comprises a composition according to the formula $(Y_{1-x}Ca_x)(Cr_{1-y}Al_y)O_3$, where x=0.03 to 0.05 and y=0.85. As a result, the temperature probe 1 is particularly suited for high temperature applications. As an alternative to this, the sensor element, in particular at low application temperatures of the temperature probe 1, can comprise a ceramic with a spinel structure. For example, the ceramic of the sensor element can comprise a composition according to the formula $Co_{3-(x+y)}Ni_xMn_yO_4$, where x=1.32 and y=1.32.

The ceramic housing 3 comprises an opening 30, by means of which the ceramic housing 3 is open at one end. A cavity 31, which comprises a bottom surface 311 which is opposite the opening 30 and has a step-shaped indentation 312, is realized inside the ceramic housing 3. The functional ceramic sensor element 2 is arranged at least partially recessed in the indentation 312. In particular, the sensor element 2 is arranged in a main region 313 of the indentation 312, the form and size of which is adapted to a length and width of the sensor element 2. In each case, on two opposite sides of the main region 313 a side pocket 314 adjoins the main region 313 of the indentation 312. The side pockets 314 are also recessed regions inside the cavity 31 just as the main region 313. When viewed looking into the opening 30, between the side pockets 314 the main region 313 comprises a recessed region, which adjoins the remaining regions of the cavity 31 in a step-shaped manner and the bottom surface 311 of which, when viewed from the opening 30, comprises a greater depth than the side pockets 314.

The temperature probe 1 comprises two contact elements 4 which are realized as connecting wires and are arranged in each case at least in part in one of the side pockets 314. By way of their respective other end, the contact elements 4 project out of the ceramic housing 3 and thus serve for the external contact of the temperature probe 1. The contact elements 4 comprise platinum. As an alternative to this, the contact elements 4 can comprise gold, silver or other noble metals, or however alloys, preferably highly temperature stable steel alloys, for example with large contents of chrome and/or nickel or can consist thereof.

The sensor element 2 comprises an electrode 21 on each of the two opposite side faces. The electrodes 21 of the sensor element 2 comprise platinum. As an alternative to this, the electrodes 21 can comprise gold or silver or silver-palladium or can consist thereof. The contact elements 4 are connected in each case one to of the electrodes 21 of the sensor element 2 so as to be electrically conducting, in each case by means of a burnt on metallization paste 5 which is arranged in the side pockets 314. The metallization pastes 5 serve both for fixing the contact elements 4 inside the side pockets 314 and for the electrical contact between the contact elements 4 and the electrodes 21 of the sensor element 2. In the exemplary embodiment shown, the metallization pastes 5 comprises gold. As an alternative to this, the metallization pastes 5 can comprise silver, platinum, copper, molybdenum or tungsten or silver-palladium or can consist thereof.

The ceramic housing 3 comprises a rounded end which is opposite the opening on the outside surface. In addition, the ceramic housing 3 comprises a projection 32 which adjoins the opening 30. The projection 32 is realized as a circumferential collar and can serve, for example, for the purpose of arranging the temperature probe 1 in a sleeve-shaped element of a temperature sensor system inside an opening of the sleeve-shaped element.

In addition, the ceramic housing 3 is closed at the rear by means of a glass paste 6, through which the contact elements 4 project. As a result of its design and the materials used, the temperature probe 1 is distinguished in particular by good long-term or medium stability, a high level of sturdiness and a very short response time.

The sensor element 2 of the temperature probe 1 comprises dimensions of approximately 0.85 mm×0.7 mm×0.7 mm. The ceramic housing 3 of the temperature probe 1 comprises maximum outside dimensions of approximately 2.5 mm×2.3 mm (diameter×height). In addition, the ceramic housing 3 comprises wall thicknesses of between 0.1 mm and 1 mm. The length of the temperature probe 1 including the contact elements 4 is approximately 10.8 mm.

In an advantageous manner, the temperature probe 1 offers both a particularly sturdy casing for the sensor element 2 and a particularly short response time. In addition, the ceramically encapsulated temperature probe 1 shown here distinguishes itself for use at high application temperatures in particularly aggressive media or gases.

Figure 6:
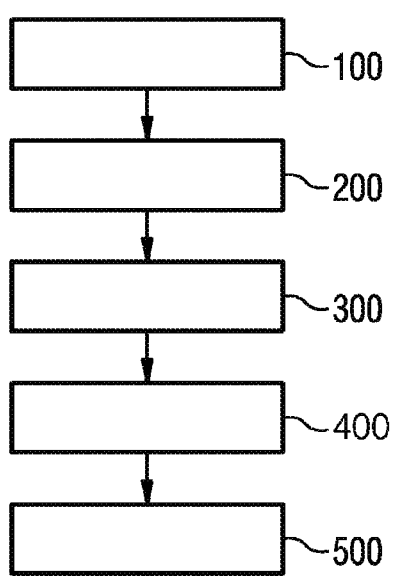
FIG. 6 shows a method for producing a temperature probe according to a further exemplary embodiment.

FIG. 6 shows a method for producing a temperature probe 1 described here according to one exemplary embodiment. In this case, a ceramic raw material and a functional ceramic sensor element 2 which is provided with electrodes 21 are prepared in a first step 100. The ceramic raw material is then formed into a green body by means of a ceramic injection molding process and the green body is then sintered to form a ceramic housing 3 in a further method step 200. The green body, in this case, is preferably freed of organic parts prior to the sintering process by means of a one-step or two-step debinding process.

In a further subsequent method step 300, the sensor element 2 is arranged in such a manner in the ceramic housing 3 that at least one side face 20 of the sensor element 2 comprises a direct positive locking contact with the ceramic housing. Then, in a further method step 400, a metallization paste 5 is introduced into side pockets 314 of the ceramic housing 3 and after this contact elements 4 are arranged in the side pockets 314 such that ends of the contact elements 4 are embedded in the metallization pastes 5. The metallization paste is then burnt on. As a result, an electrically conducting contact is produced between the contact elements 4 and the electrodes 21 of the sensor element 2. The ceramic housing 3 is closed at the rear by means of a glass paste 6 and the glass paste 6 is then burnt on in a subsequent method step 500.

The exemplary embodiments shown in the Figures can comprise further features according to the embodiments of the general description as an alternative to this or in addition to it.

The invention is not limited by the description with the exemplary embodiments to the same but includes each new feature as well as each combination of features. This includes in particular each combination of features in the claims, even if said feature or said combination is not itself provided explicitly in the claims or exemplary embodiments.

The invention claimed is:

1. A temperature probe, comprising:
    a functional ceramic sensor element; and
    a ceramic housing, wherein the ceramic sensor element is arranged in the ceramic housing;
    a temperature sensor comprising two contact elements, the two contact elements being located on opposite sides of the ceramic sensor element, wherein each contact element is electrically connected to the ceramic sensor element;
    wherein the ceramic housing comprises a cavity with a recessed region, wherein side walls and a bottom wall of the recessed region are defined by a ceramic material of the ceramic housing;
    wherein the ceramic sensor element is located at least partially in the recessed region, and wherein the contact elements are located sideways from the recessed region in a top view and do not protrude into the recessed region.

2. The temperature probe according to claim 1, wherein the ceramic housing is an injection molded housing.

3. The temperature probe according to claim 2, wherein the contact elements project out of the ceramic housing;
    wherein the ceramic housing comprises an opening at one end; and
    wherein the cavity comprises a bottom surface on an opposite side of the housing from the opening, and a step-shaped indentation, wherein the step-shaped indentation comprises a main region and two side pockets which adjoin two opposite sides of the main region, and wherein the main region comprises the recessed region and each of the contact elements is arranged at least in part in one of the side pockets; and
    wherein the sensor element comprises two electrodes, and wherein the contact elements are electrically connected to an electrode of the sensor element by a burnt on metallization paste which is arranged in the side pockets.

4. The temperature probe according to claim 1, wherein the ceramic housing comprises:
    an opening at one end; and
    wherein the cavity comprises a bottom surface on an opposite side of the housing from the opening and a step-shaped indentation, wherein the step-shaped indentation comprises the recessed region.

5. The temperature probe according to claim 4, wherein the step-shaped indentation comprises a main region comprising the recessed region and two side pockets which adjoin two opposite sides of the main region, and wherein the side pockets comprise a depth which, when viewed from the opening, is smaller than a depth of the bottom surface.

6. The temperature probe according to claim 5, wherein each of the contact elements is arranged at least in part in one of the side pockets, and wherein the contact elements project out of the ceramic housing.

7. The temperature probe according to claim 6, wherein the sensor element comprises two electrodes, and wherein the contact elements are electrically connected to an electrode of the sensor element by a burnt on metallization paste which is arranged in the side pockets.

8. The temperature probe according to claim 1, wherein an opening of the ceramic housing is closed by means of a glass sealant.

9. The temperature probe according to claim 1, wherein the functional ceramic sensor element is an NTC element or a PTC element.

10. The temperature probe according to claim 1, wherein the sensor element comprises one of the following structures: a perovskite structure including elements Y, Ca, Cr, Al and O, or a spinel structure including elements Ni, Co, Mn and O.

11. The temperature probe according to claim 1, wherein the ceramic housing comprises a wall with thicknesses of between 0.1 mm and 1 mm.

12. The temperature probe according to claim 1, wherein the ceramic housing comprises aluminum oxide.

13. A method for producing a temperature probe, comprising:
providing a functional ceramic sensor element comprising electrodes;
providing contact elements;
preparing a ceramic raw material and forming the ceramic raw material into a green body using an injection molding method;
sintering the green body to form a sintered ceramic housing; wherein the sintered ceramic housing comprises a recessed region, wherein side walls and a bottom wall of the recessed region are defined by a ceramic material of the ceramic housing; and
arranging the sensor element in the sintered ceramic housing so that the sensor element is at least partially located in the recessed region and arranging the contact elements at positions located sideways from the recessed region in a top view such that the contact elements do not protrude into the recessed region and the contact elements are electrically connected to the sensor element.

14. The method according to claim 13, wherein contact elements are electrically connected to the electrodes by burning on metallization pastes.

15. The method according to claim 13, wherein an opening of the ceramic housing is closed by burning on a glass paste.

16. A method of making a temperature probe, comprising:
providing a functional ceramic sensor element and contact elements; and
arranging the ceramic sensor element in a ceramic housing, wherein the ceramic housing comprises a recessed region, wherein side walls and a bottom wall of the recessed region are defined by a ceramic material of the ceramic housing;
arranging the contact elements in the ceramic housing at opposite sides of the ceramic sensor element at positions located sideways from the recessed region in a top view on the bottom wall such that the contact elements do not protrude into the recessed region after arranging the ceramic sensor element at least partially in the recessed region; and
electrically and mechanically connecting the contact elements with the ceramic sensor element by burning in a metallization paste inside the housing.

17. The method according to claim 16, wherein the ceramic housing comprises:
an opening at one end; and
a cavity comprising a bottom surface on an opposite side of the housing from the opening and a step-shaped indentation, wherein the sensor element is arranged at least partially in the indentation.

18. The method according to claim 16, wherein the ceramic housing is an injection molded housing.

19. The method according to claim 16, wherein the functional ceramic sensor element is an NTC element or a PTC element.

20. The method according to claim 16, wherein the functional ceramic sensor element comprises one of the following structures: a perovskite structure including elements Y, Ca, Cr, Al and O, or a spinel structure including elements Ni, Co, Mn and O.

21. The method of claim 16, wherein the metallization paste is filled in the ceramic housing after accommodating the ceramic sensor element in the ceramic housing and before accommodating the contact elements in the housing.

* * * * *